United States Patent [19]

Harker

[11] Patent Number: 5,098,237
[45] Date of Patent: Mar. 24, 1992

[54] ARRANGEMENT FOR RETAINING AN ARTICLE TO A STRUCTURAL SURFACE

[75] Inventor: Brian G. Harker, Granger, Ind.

[73] Assignee: JTB, Inc., South Bend, Ind.

[21] Appl. No.: 582,011

[22] Filed: Sep. 13, 1990

Related U.S. Application Data

[63] Continuation of Ser. No. 236,796, Aug. 25, 1988, abandoned, which is a continuation-in-part of Ser. No. 70,897, Jul. 8, 1987, Pat. No. 4,902,179.

[51] Int. Cl.⁵ .................. F16B 13/04; F16B 35/04
[52] U.S. Cl. ............................. 411/21; 411/412; 411/424; 411/510
[58] Field of Search ............... 411/45, 48, 412, 413, 411/424, 426, 41, 21, 508–510; 248/231.9, 225.1

[56] References Cited

U.S. PATENT DOCUMENTS

| | | | |
|---|---|---|---|
| 1,596,603 | 8/1926 | Enoch | 248/223.1 X |
| 1,864,039 | 6/1932 | Brownson | 248/225.1 |
| 3,580,535 | 5/1971 | Naske | 248/225.1 X |
| 3,905,570 | 9/1975 | Nieuwveld | 411/510 X |
| 4,138,921 | 2/1979 | McGauran et al. | 411/510 |
| 4,141,108 | 2/1979 | Busse | 248/223.1 X |
| 4,233,878 | 11/1980 | McGauran et al. | 411/510 |
| 4,381,622 | 5/1983 | Spidell | 411/510 X |
| 4,391,559 | 7/1983 | Mizusawa | 411/45 |
| 4,610,330 | 9/1986 | Borst | 411/510 X |
| 4,702,349 | 10/1987 | Zenhausern | 411/510 X |
| 4,781,351 | 11/1988 | Parapetti | 411/413 X |
| 4,808,051 | 2/1989 | Geitl | 403/408.1 X |
| 4,902,179 | 2/1990 | Harker | 411/21 |

FOREIGN PATENT DOCUMENTS

| | | | |
|---|---|---|---|
| 1191633 | 4/1965 | Fed. Rep. of Germany | 411/45 |
| 2636916 | 2/1978 | Fed. Rep. of Germany | 411/510 |
| 616983 | 2/1961 | Italy | 411/424 |

*Primary Examiner*—Lloyd A. Gall
*Attorney, Agent, or Firm*—Barnes & Thornburg

[57] ABSTRACT

An article retention arrangement utilizing a drive-in expansion fastener having a generally cylindrical, hollow body with a tapered end formed from an angular truncation of the body. The body is reinforced by one longitudinal rib so as to permit drive-in penetration from the tapered end even if the fastener is formed from plastic materials. The fastener is retained within the wall by at least one pair of hinged flanges which expand circumferentially in response to the installation of an insertion element within the hollow portion of the body. The insertion element engages an inclined surface within the body to cam the expansion flanges circumferentially outward. The expansion flanges engage the back surface of the wall while the longitudinally slit portion of the body expands within the hole created by drive-in penetration. The insertion element preferably includes an enlarged head projecting from the fastener when the insertion element is fully installed within the fastener. This head is spaced apart from the fastener and the wall by a reduced diameter portion. Thus, articles can be mounted to the wall by direct application to the insertion element. The insertion element can include a series of truncated conical sections formed so as to facilitate uni-directional insertion into the fastener and restrict removal of the insertion element. That element is also dimensioned with respect to the fastener to have a close fit which increases load support.

3 Claims, 4 Drawing Sheets

ARRANGEMENT FOR RETAINING AN ARTICLE TO A STRUCTURAL SURFACE

This application is a continuation of U.S. patent application Ser. No. 07/236,796, filed Aug. 25, 1988, now abandoned, which is a continuation in part of U.S. patent application Ser. No. 07/070,897, filed July 8, 1987, now U.S. Pat. No. 4,902,179, issued Feb. 20, 1990.

BACKGROUND AND SUMMARY OF THE INVENTION

The present invention relates generally to an article retaining arrangement and, more particularly to an article retaining arrangement utilizing various combinations of expansion fasteners, article engaging portions and surface retaining portions as used with drywall or similar panels or walls in building construction.

Numerous different article retaining arrangements are known. Such devices are often used to retain pictures, ornaments, hooks or other articles directly to the interior building wall. Such walls are typically nailed or glued to skeletal frame members of the building and subsequently the gaps between adjacent sheets are taped and covered with paint or wallpaper. Once so covered, it is usually difficult to locate the underlying frame members. Thus, article retaining arrangements tend to rely only upon the support strength of the drywall board or wall panel element itself.

Two general types of drywall expansion fasteners are used: Those that require prior drilling or punching through the wall to permit fastener insertion, and those that are self-penetrating in that they may be directly hammered, punched or screwed into the wall. The latter type of fasteners are typically referred to as "drive-in fasteners" and tend to be preferred since they permit quicker installation. However, prior drive-in fasteners frequently could not support the same loads as fasteners using preformed holes since the act of penetrating the wall with drive-in fasteners tends to create a "blow out" in the back side of the wall.

Blow outs are believed to result from the fact that prior drive-in fasteners merely push the wall material aside and forward during their penetration. This displaced material appears to weaken the adjacent wall structure and creates a larger opening at the side of the wall opposite the initial penetration of the fastener. A typical blow out situation is shown in FIG. 1. The fastener 10 (shown only in part) penetrated wall 12 from left to right. The initial penetration opening has a width of I. The opening created by the blow out has a significant larger width B. As a result, load support within the wall for the fastener is available only for the distance L where the width of the hole closely corresponds to the width of fastener 10. As a general rule, the larger L becomes, the more load the fastener can support.

Blow outs can also be a problem for fasteners using preformed holes, but, for example, careful drilling can minimize the occurrence of blow outs. Unfortunately, such drilling is time-consuming and, especially where a large number of fasteners are needed, can result in significantly higher installation costs.

The installation costs are also effected by the price of the article retaining arrangement itself. To retain the fastener in the wall, a portion of the fastener which has penetrated the wall often expands so as to prevent the fastener from being withdrawn from the hole created in the wall. The expansion can occur within the hole or past the hole on the back side of the wall. Mechanisms which create this expansion are sometimes elaborate and can significantly increase the fastener's production costs.

Typically, it is also important not to create bulges in the wall surrounding the fastener when expanding the fastener to retain it in the wall. These bulges can be unsightly and can structurally weaken the wall. Thus, stress control and fastener expansion can be critical.

Insertion elements for controlled fastener expansion are often expensive and require specially formed parts. Some prior fasteners have been constructed to reduce these costs by permitting expansion adjustment through ordinary screws provided by the installer. Unfortunately, the torque required to insert those screws is frequently so high that the installation of a number of these fasteners becomes overly tiring and/or time consuming. In addition, it is common that a particular fastener of that type will accept only one screw size. On the other hand, fasteners which are adjustable by extremely low threading torque sometimes give no indication of when the fastener has bottomed out and is fully engaged wtih the back of the wall. As a result, the installer may not realize when to stop threading and may cause serious damage to the wall, if threaded too far, or inadequately secure the fastener, if not threaded far enough.

Since threaded elements requiring rotation have been typically used, it is normally necessary to provide anti-rotation fins or ribs in the fastener in order to allow the screw to be rotated and inserted into the fastener. Such fins often require a larger hole to be made in the drywall than would be necessary if an insertion element could be used which does not require rotation for installation.

It is often necessary to insert a screw so that its head is flush with the fastener in order for the expansion to occur. Since there is no other stop provided on a typical screw, it is difficult to determine when the screw has been adequately inserted to engage the expansion elements while still providing enough of an extension form the wall to retain articles such as pictures, ornaments, hooks or other items.

Applicant's copending U.S. patent application Ser. No. 070,897 filed July 8, 1987, describes in detail a preferred solution to many of these problems and concerns. To the extent not explicitly set forth herein, the disclosure of that application is incorporated by reference. The present application is directed further to improving upon the typical usage of applicant's prior invention, particularly through improvement of the article engaging and fastener expansion features.

Specifically, it has been found to be desirable to minimize the effort necessary for an insertion element to expand the fastener to secure it to the wall. At the same time it is desirable to maximize the force necessary for removal of that insertion element from the fastener up to a point where inadvertent removal does not occur under normal usage. Beyond that point removal of the insertion element should be facilitated to avoid unintended destruction of the fastener and/or wall surface. Preferably the insertion element could enter and expand the fastener by uni-directional force, similar to the pounding of a nail by a hammer.

Further, it has been found to be desirable to provide increased load support for articles retained on the fastener. At the same time, it is desirable to minimize the number of individual elements necessary for attachment of decorations and utility articles to a wall surface.

Among other factors, these two objectives can be important in cost reduction, ease of assembly and security of installation.

It is, therefore, an object of the present invention to provide an improved article retention arrangement which overcomes limitations of previous article retention arrangements.

In addition to the objectives and purposes of applicants above-noted previous fastener invention, it is another object of the present invention to provide an inexpensive and reliable article retention arrangement which is readily secured to a wall or ceiling.

Still a further object is the provision of an article retention arrangement with minimal actuation effort requirements and increased actuation retention up to a predetermined level so as to minimize accidental disassembly of components.

Still a further object is a provision of an article retention arrangement having improved load support.

Still a further object is the provision of an article retaining arrangement having simplified assembly requirements and having features readily incorporable into decorations and utility articles to be mounted to walls or ceilings.

These and other objects of the present invention are attained by the provision of an article retention arrangement utilizing a driven-in expansion fastener having a generally cylindrical, hollow body with a tapered end formed from an angular truncation of the body. The body is reinforced by one longitudinal rib so as to permit drive-in penetration from the tapered end even if the fastener is formed from plastic materials. The fastener is retained within the wall by at least one pair of hinged flanges which expand circumferentially in response to the installation of an insertion element within the hollow portion of the body. The insertion element engages an inclined surface within the body to cam the expansion flanges circumferentially outward. The expansion flanges engage the back surface of the wall while the longitudinally slit portion of the body expands within the hole created by drive-in penetration.

The present invention avoids blow outs by creating a clean cut through the drywall with the tapered end and receiving the cutout debris within the fastener as the penetration is made. Thus, destructive stress within the wall beyond the penetration hole is minimized. The fastener and/or the insertion element can be molded from a self-lubricating nylon or polyester so as to minimize the effort required to install the insertion element. Installation is, for example, completed when an initial enlarged portion of the insertion element is flush against a shoulder portion of the expansion fastener extending from or on the front surface of the wall. Installation of the insertion element primarily causes the hinged flanges to move circumferentially outward along the back surface of the wall, rather than into it. Thus, bottoming out the insertion element on the fastener shoulder avoids creating bulges and undesired expansion stress within the wall.

The insertion element preferably includes an enlarged head projecting from the fastener when the insertion element is fully installed within the fastener. This head is spaced apart from the fastener and the wall by a reduced diameter portion. Thus, articles can be mounted to the wall by direct application to the insertion element. Alternatively, an article engaging element containing an angular slot for slidably receiving the installation element may be utilized to removably secure articles such as hooks, curtain rods, soap dishes, towel bars, storage racks or other items. This article engaging element can also be integrally formed within such articles. Alternatively, the fastener itself can be formed with an enlarged head extending from the shoulder and spaced apart from the wall surface which is directly receivable within the slot of said article engaging element.

Further, the insertion element includes a series of truncated conical sections formed so as to facilitate uni-directional insertion into the fastener and restrict removal of the insertion element. That element is also dimensioned with respect to the fastener to have a close fit which increases load support. Similarly the slot of the article engaging element is dimensioned and inclined so as to improve load support.

Other objects, advantages and novel features of the present invention will become readily apparent upon consideration of the following description of preferred embodiments in conjunction with the drawings.

DESCRIPTION OF THE PREFERRED EMBODIMENTS

Figure 1:
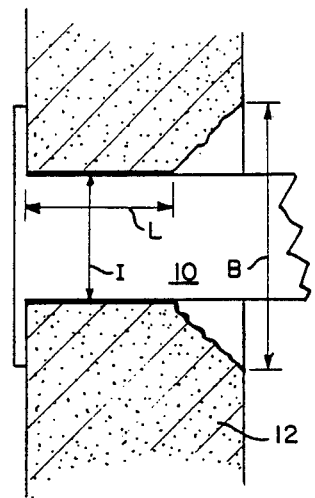
FIG. 1 shows a cross sectional representation of a prior art arrangement wherein the drive-in fastener has caused a blow out in the wall.
Figure 6:
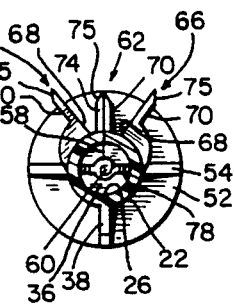
FIG. 6 shows a left-end view of the expansion fastener taken along line 6—6 of FIG. 2.
Figure 7:
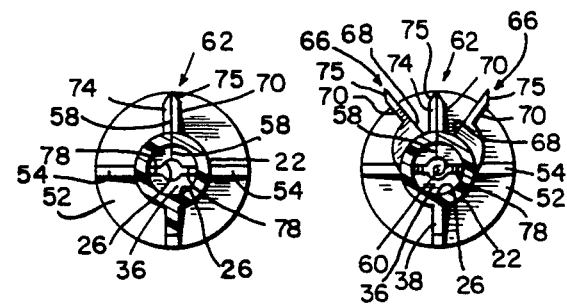
FIG. 7 shows a left-end view of the expansion fastener taken along line 6—6 of FIG. 2 after adjustment expansion.
Figure 2:
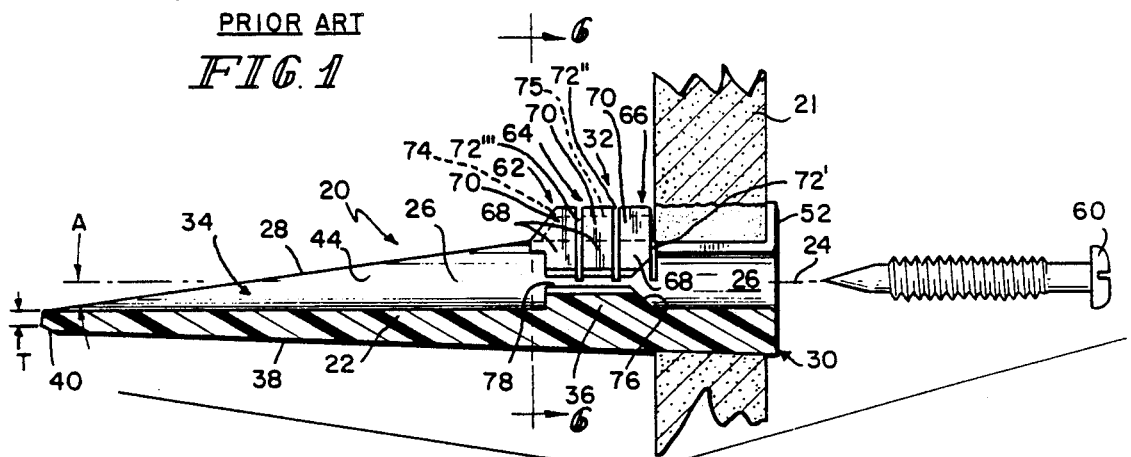
FIG. 2 shows a cross sectional view of an expansion fastener according to the present invention after initial wall penetration and prior to fastener expansion.

FIG. 2, which illustrates a preferred embodiment of the present invention, shows a drive-in expansion fastener 20 suitable for use with standard drywall boards and other similar wall panels, ceilings or the like structural panels or walls. Fastener 20 can be driven into a drywall board or wall 21 by an ordinary hammer (not shown) without creating excessive blow out. As shown, the width of the hole through the wall closely corresponds to the width of the fastener for the entire length of that hole. It has been found that such fasteners can be properly molded from polyester or nylon plastics. One such commercially available material is "Rynite SST 35". This material can presently be obtained from Nyloncraft, Inc., of Mishawaka, Ind.

Fastener 20 includes a generally cylindrical body portion 22 which preferably extends along longitudinal axis 24. As shown, body portion 22 is hollow and is formed with passageway 26 extending from one end to the other. Tapered portion 28 is formed at one end of body portion 22, and base portion 30 is formed at the other end. Flanged portion 32, which serves to retain fastener 20 within the wall is located, between tapered portions 29 and base portion 30.

Tapered portion 28 is preferably created as an angular truncation of body portion 22. In visual affect, this truncation creates a slice or cut across body portion 22 at a slight angle A with respect to longitudinal axis 24. As shown, the truncation exposes passageway 26. Thus, in some respects tapered portion 28 resembles the tip of a hypodermic needle. Typically, angle A is less than 45°. The specific angle used according to teachings of the present invention will depend upon the composition, density and thickness of the wall and the dimensions of fastener 20. Angle A is selected so as to facilitate a clean and gradual cut through the wall. A gradual cut is preferred so that substantially all of the wall debris can be received within fastener 20 when penetrating the wall. As shown, with ordinary drywall boards and an initial passage way opening of approximately 0.17 inch (0.43 cm) in diameter, angle A is between 5° and 10°.

The wall debris is received during penetration in open portion of 34 of passageway 26. In certain embodiments, the configuration of fastener 20 can exert compressive stress on the wall as it is penetrating, but this stress is minimized by accumulating debris within fastener 20. In this manner, blow outs are minimized since the fastener does not simply plow through the wall. At the same time, passageway 20 includes a reduced diameter portion 36 which prevents that debris from interfering with the expansion adjustment by a threaded screw or other element inserted within the fastener to retain it in place in the wall.

To reinforce body portion 22 and facilitate drive-in of fastener 20 when formed from plastic materials, longitudinal rib 38 is provided from base portion 30 to the end of tapered portion 28. Rib 38 is, for example, integrally molded with body portion 22 and after an initial transition angle remains a constant thickness and/or width from base portion 30 to tapered portion 28.

Figure 3:
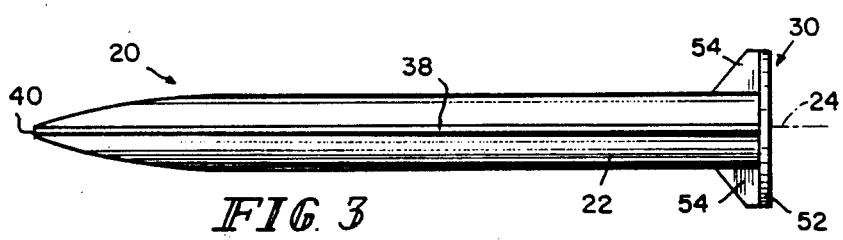
FIG. 3 shows a bottom elevational view of the expansion fastener of FIG. 2.
Figure 5:
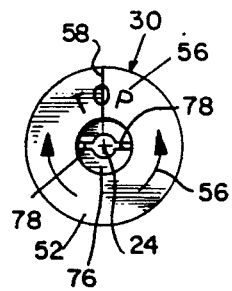
FIG. 5 shows a right-end view of the expansion fastener of FIG. 2.
Figure 4:
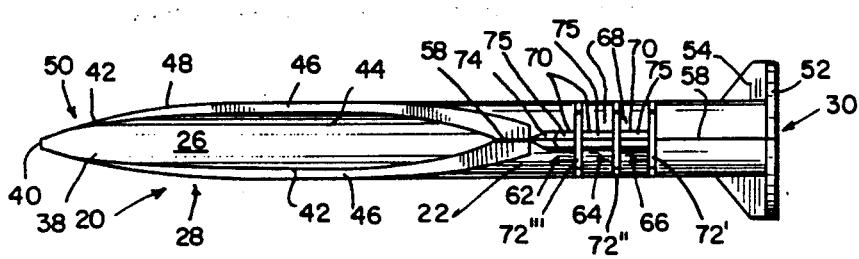
FIG. 4 shows a top elevational view of the expansion fastener of FIG. 2.

Tip end 40 of tapered portion 28 provides initial cutting penetration for fastener 20. As shown, tip end 40 has a flat, vertical end wall of height T, that height corresponding to the radial wall thickness of cylindrical body portion 22. On the other hand, as shown in FIGS. 2 and 3, tip end 40 includes a horizontal point of minimal width.

To further facilitate penetration, tapered portion 28 is preferably provided with cutting edges 42 on body portion 22. For example, fastener 20 includes an interior surface 44 lining passage way 26 and an exterior surface 48. Interior surface 44 can be provided with cutting edge 42 at its uppermost portion when the angular truncation of body portion 22 leaves a narrow, flat surface 46 across tapered portion 28 between interior surface 44 and exterior surface 48. Flat surface 46 can also be tapered towards tip end 40 as shown at 50 to reduce wall stress even more during initial penetration.

Base portion 30 is provided with a circumferential, radially extending shoulder or flange 52 to support the drive-in load (as, for example, caused by hammering) on fastener 20 during wall penetration. This flange is, in certain preferred embodiments, relatively thin so as to minimize outward projection from the wall surface when the fastener is fully mounted. Flange 52 also serves as a stop or limit to the penetration of the wall by fastener 20 and as a stop or limit to the extent of insertion of the retention element. Radial ribs or flanges 54 are provided on body portion 22 and, for example, extend from flange 52 along longitudinal axis 24 toward tip end 40. Flanges 54 serve to stiffen flange 52 and assist in supporting drive-in load. Flanges 54 are also typically much shorter than rib 38 and, in combination with rib 38, serve to prevent rotation of the fastener with respect to the wall by slightly penetrating and engaging the wall when the fastener is fully in place. Base portion 30 is also provide with indicia 56 on its end face for indicating the angular orientation of fastener 20 about axis 24. It has been found that greater loads can typically be supported at some orientations of fastener 20 than at other positions.

Body portion 22 includes a split length 58 extending from base portion 30 to tapered portion 28. This split is, for example, longitudinally aligned and divides flange 52 and flange portion 32. Split length 58 permits expansion of body portion 22 to establish retention of the fastener within the wall. This expansion can be caused by insertion of a fastener retention element or "insertion element" 60 into passageway 26.

Figure 8:
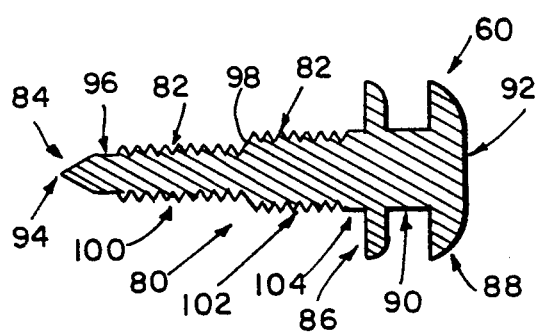
FIG. 8 shows a cross-sectional view of an insertion element for installation into the expansion fastener of FIG. 2 according to the principles of the present invention.

As described above and in the parent application, insertion element 60 can be formed as a threaded screw or a smooth sided nail. FIG. 8 shows another preferred embodiment of insertion element 60, that embodiment including a plurality of truncated conical sections 82 formed as if stacked along a cylindrical shaft 80. Cross-sectionally, these conical sections form a saw toothed arrangement with each tooth being inclined toward insertion end 84. This arrangement has been found to facilitate insertion of element 60 into fastener 20 while at the same time providing increased resistance to removal of element 60 from fastener 20 once fully inserted therein. In many applications it is desirable to permit element 60 to be intentionally removed and reinserted but not to be accidentally removed or worked lose by ordinary usage. Thus, conical sections 82 should be dimensioned and formed of such material as to permit removal from fastener 20 without destruction of either the fastener or the insertion element. One method of accomplishing these objectives is to mold fastener 20 and element 60 from similar plastic materials, those materials being capable of some elastic deformation. In such an arrangement it is believed that the relatively sharp, protruding edge of each conical section causes localized elastic deformation of either itself and/or the interior surfaces of fastener 20 when fully inserted therein. This deformation appears to result in significantly increased resistance to removal of element 60 up to a certain level of removal force and yet such an element 60 can be readily inserted within fastener 20 by uni-directional insertion force. Such force can be applied, for example, by pounding that element into place with a hammer.

Element 60 of the present invention also preferably includes first and second radially extending shoulders or dimensionally enlarged portions 86 and 88, respectively, separated by a reduced diameter or dimensionally reduced portion 90. Shoulder 86, for example, serves as a stop to abut flange 52 of fastener 20 at or near the wall surface to limit insertion of element 60 into fastener 20. Shoulder 88, for example, serves to retain an article supported by portion 90. Alternatively, as will be described further below with reference to FIGS. 10, 11 and 15-17, shoulder 88 can serve as a head portion for receiving and retaining a separable article engaging element. When portion 90 is employed to support an article, such as a picture mount, keyhole slot or wire, shoulder 88 can, for example, be formed with flat end surface 92 to be advantageously used to received the impact of a tool, such as a conventional hammer, for inserting element 60 into fastener 20.

The portion of element 60 which is inserted within fastener 20 is preferably formed with a tapered section 94 for initial penetration of the fastener. Cylindrical section 96 can be formed between tapered section 94 and an inclined leading edge 98 starting conical sections 82. In especially preferred embodiments conical sections 82 are formed into a first group 100 and a second group 102. The conical sections of first group 100 has smaller diameters than the conical sections of second group 102. The difference between these two diameters can be slight, on the order of a few thousandths of an inch, but has been found to be sufficient to gradually increase the retentive ability of the conical sections without significantly increasing the necessary insertion force. At the same time, these diameters are formed to provide positive expansion of flange elements 70.

Another factor that is believed to assist in retaining insertion element 60 within fastener 20 is the spacing between the conical sections. It is presently understood that the radially outward edge of each conical section should be spaced sufficiently apart from the next edge so as to permit some relaxation of the elastic deformation and, consequentially, dimensional expansion on the interior surfaces of fastener 20 between those edges.

Element 60 of especially preferred embodiments is also formed with a cylindrical portion 104 between second group 102 and shoulder 86. Cylindrical portion 104 is preferably larger in diameter than the conical sections of group 102. The difference between these diameters is also typically only a few thousandths of an inch. Cylindrical portion 104 is also preferably of the same diameter as or a slightly larger diameter than passageway 26. Thus, cylindrical portion 104 causes a snug interference fit when inserted within passageway 26. This interference fit is believed to contribute to the increased load bearing capacity of the present invention by reducing play or movement between separable elements.

It has also been found to be advantageous to flatten a longitudinally extending portion of the conical sections to permit product identifying symbols or trademarks to be stamped onto the conical sections.

Figure 9:
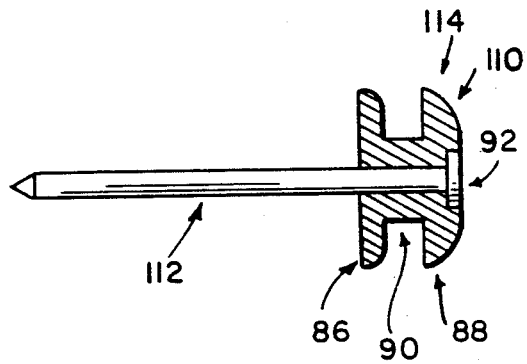
FIG. 9 shows a cross-sectional view of an alternative embodiment of the insertion element according to the present invention.

Referring to FIG. 9, an article retaining or insertion device 110 analogous to element 60 is shown. This device is particularly suited for use when an expansion fastener 20 encounters a dry wall stud or support (not shown) behind the wall. Although the expansion fastener 20 can readily penetrate drywall 21, it will occasionally be unable to penetrate into the underlying support studs. Device 110 is preferably formed with a conventional metal nail shaft 112 or penetrate through the wall and into the support stud. That nail shaft retains device 110 to the stud. Device 110 includes an enlarged head portion 114 with the same features as on that portion of insertion element 60 which protrudes from fastener 20 during normal usage.

Flange portion 32 includes at least one pair of circumferentially expandable elements to retain the fastener by engaging the back surface of the wall and/or enlarging the fastener such that it cannot be pulled back towards the front surface of the wall. As shown, three such pairs 62, 64 and 66 are provided. Each pair comprises two opposing retaining arms separated by split length 58. Each retaining arm includes a body element 68 and a flange element 70. These pairs are spaced apart along body portion 22 and are separated by lateral slices 72 in the body portion such that each pair is separately expandable. Flange elements 70 project radially outward from and, as shown, longitudinally along body portion 22. Prior to expansion, elements 68 are generally continuous with body portion 22 and enclose a portion of passage 26.

Flange portion 32 is longitudinally spaced from shoulder flange 52 by a distance approximately equal to the wall thickness such that shoulder flange 52 and flange element 70 bound that wall on either side when fastener 20 fully penetrates the wall. In preferred embodiments of the present invention, various different wall thicknesses can be accommodated by the same fastener by specific dispositions of shoulder flange 52, flange element 70 and slices 72. For example, the distance towards tip end 40 from shoulder flange 52 to first slice 72' would be ⅜" (0.95 cm), from shoulder flange 52 to second slice 72" would be ½" (1.27 cm), and from shoulder flange 52 to third slice 72'" would ⅝" (1.58 cm). That arrangement would permit fastener 20 to be used with drywall boards that are ⅜", ½" or ⅝" thick. The width of slices 72 permits room for accommodating variations in wall thickness, such as that caused by paint and/or wallpaper. Thus, expansion of flange portion 32 would not scrape material off the back surface of the wall and thereby weaken the wall.

In the embodiment illustrated in FIG. 2, the wall thickness is equal to or just less than the distance between shoulder flange 52 and first slice 72'. In other applications if the wall thickness is greater, flange pairs 64 and/or 66 may not fully emerge from the hole created in the wall by penetration of the fastener. However, adequate retention of the fastener is available with at least one flange pair which emerges and is expandable along the backside of the wall. In applications where fastener 20 supports only minimal loads and/or expansion within the wall is permissible, adequate retention is available even if no flange pair emerges from the wall.

Flange elements 70 of flange pair 62 are provided with leading edges 74 which are formed so as to cut through the wall as fastener 20 is inserted. For example, leading edge 74 can be inclined approximately 45° with respect to axis 24 in both the horizontal and vertical planes. Once this cut is made the flange element 70 of flange pairs 64 and 66 can readily follow through. In some embodiments, penetration can also be facilitated by providing tapered upper portions 75 on flange element 70.

Expansion of flange portion 32 is accomplished through the use of reduced diameter portion 36 in passageway 26. Portion 36 includes a tapered or inclined face 76 open toward base portion 30. Insertion element 60 is inserted within passageway 26 from the opening in base portion 30. Face 76 serves as cam surface or ramp for initial adjustment engagement with the leading edges of insertion element 60. As shown, split length 58 penetrates to reduced diameter portion 36. In addition, longitudinally extending slots 78 are provided along passageway 26 through portion 36. Preferably, slots 78 are co-planar with axis 24 and approximately level with the lowermost portions of slices 72. At the same time, slices 72 preferably extend approximately halfway through body portion 22. Thus, slot 78 can positively and uniformly locate the hinge base for each body element 68 to control the extent and manner of adjustment expansion.

In adjustment expansion for the arrangement of FIG. 2, insertion element 60 slides over face 76 and forces each element of flange pair 66 apart. As insertion element 60 continues in passageway 26 toward tip end 40, each element of flange pair 64 and then flange pair 62 is forced apart. The expansion of each of these flange pair elements is pivotal with respect to body portion 22 at slots 78 and enlarges the effective circumference of this portion of fastener 20. In certain embodiments, insertion of a sufficiently large retention of insertion elements will also cause expansion of body portion 22 between flange portion 32 and base portion 30 within the wall to snugly embrace the wall material. Expansion of fastener 20 within the wall is also available where, for example, the wall thickness is sufficiently large that one or more flange pairs remain within the wall. In such circumstances the flange pairs tend to expand toward the back surface of the wall to prevent withdrawal of fastener 20 toward the front surface of the wall. In this manner, retaining fastener 20 within the wall also secures insertion element 60 to the wall.

Using a self-lubricating and relatively inexpensive material such as Rynite SST 35 to form fastener 20 and/or passageway 26 can sufficiently reduce the insertion force and/or threading torque necessary to use insertion elements for adjustment expansion. Providing passageway 26 with a large diameter permits several different sized insertion elements to be used since adjustment need only result in engagement with reduced diameter portion 36. With circumferential expansion, only minimal opening of the flange pair elements is needed to provide secure retention of the fastener.

It has been found that fastener 20 has greater load bearing capacity when slit 58 is at the top of body portion 22 and rib 38 is at the bottom such that the flange pairs spread apart above the lateral midline created by the plane of slit 78 and axis 24. This load bearing capacity can be sufficiently large so as to enable fastener 20 to be used in ceiling applications.

Figure 10:
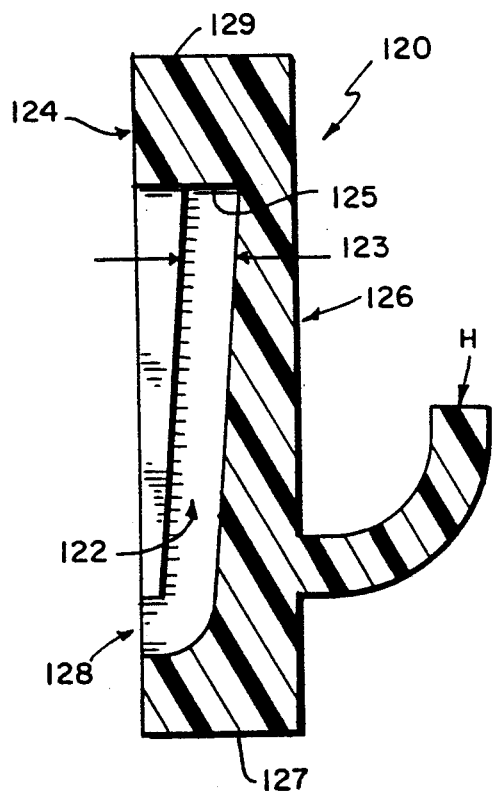
FIG. 10 shows a cross-sectional view of an article retaining element according to the principles of the present invention.

FIG. 10 shows a cross-sectional view of a typical article engaging element 120 for use with the present invention. This element includes an inclined slot 122 having substantially equal width 123 back to front and width 121 opening at back surface 124.

Slot 122 is also slightly inclined between back surface 124 of element 120 and front surface 126 of that element. This incline is preferably such that slot 122 is closer to back surface 124 at bottom 127 of element 120 than at top 129 of element 120.

Figure 11:
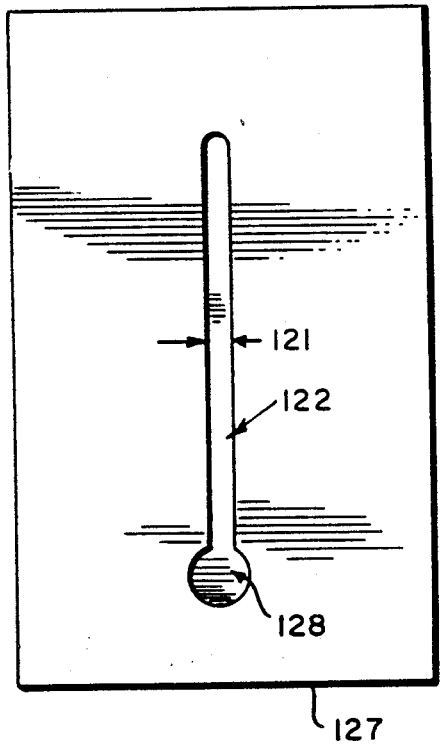
FIG. 11 shows a back plan view of the article retaining element of FIG. 10.

As shown in FIG. 11, slot 122 is provided with an entrance 128 through to back side 124. This entrance is dimensionally greater than width 121 to permit insertion and removal of head 88 through that opening. Width 121 is typically larger than the cross sectional dimension of reduced dimensional portion 90. Width 121 is typically smaller than the cross-sectional dimension of head 88 so as to preclude removal of head 88 from slot 122 except at entrance 128.

The incline of slot 122 is such that when head 88 is inserted within entrance 128 back surface 124 is slightly spaced apart from the front surface of the wall or structural panel surface retaining element 60. As element 120 is lowered to slide head 88 upward in slot 122, back surface 124 moves closer to and ultimately engages the front surface of the wall as a result of the inclination of slot 122. Preferably, this engagement of element 120 with the wall occurs before head 88 bottoms out against end wall 125 of slot 122 so as to permit the weight of articles attached to element 120 to exert a compressive force on the front surface of the wall complimentary to the retention force exerted on the back surface of the wall by fastener 20 when insertion element 60 is retained within fastener 20. When device 110 is used rather than element 60, the stud behind the wall can provide the function of retention force.

Element 120 is shown to include an exemplary hook H to which articles, such as coats, towels, or pictures, can be attached. It will now be evident to those skilled in the art that element 120 can alternatively be incorporated directly into any preferred decorative or light or moderate duty utility device, such as soap dishes, towel racks, clocks, etc, which is desired to be securely mounted to a wall or ceiling surface.

Figure 16:
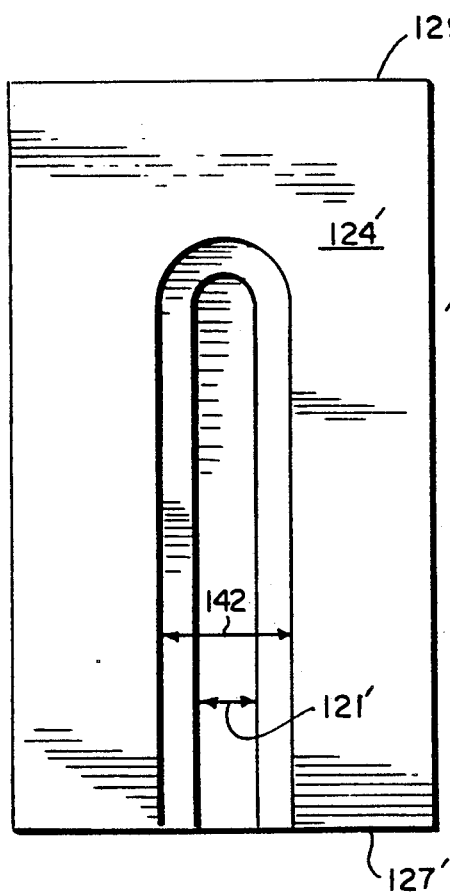
FIG. 16 shows a back plan view of the alternative embodiment of the article retaining element of FIG. 15.
Figure 15:
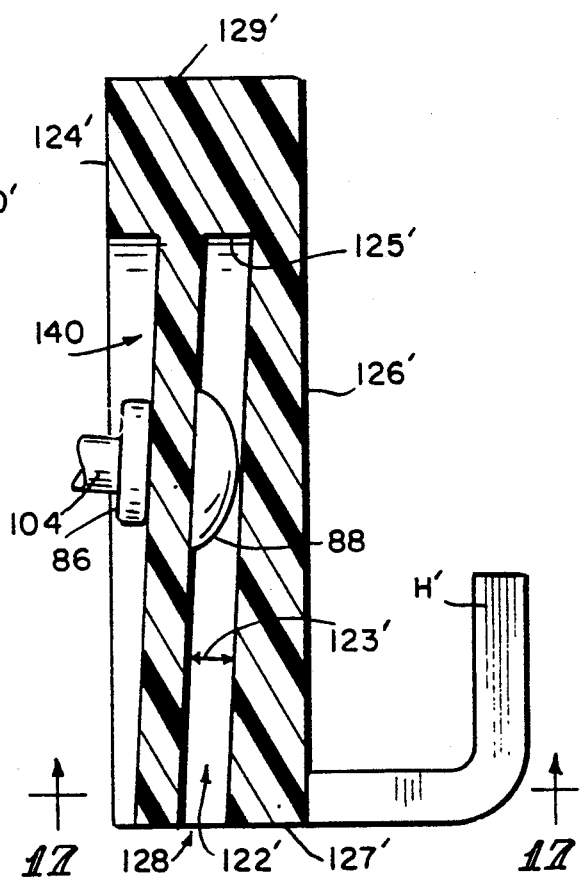
FIG. 15 shows a cross-sectional view of an alternative embodiment of the article retaining element of the present invention as taken along lines 15—15 of FIG. 17.
Figure 17:
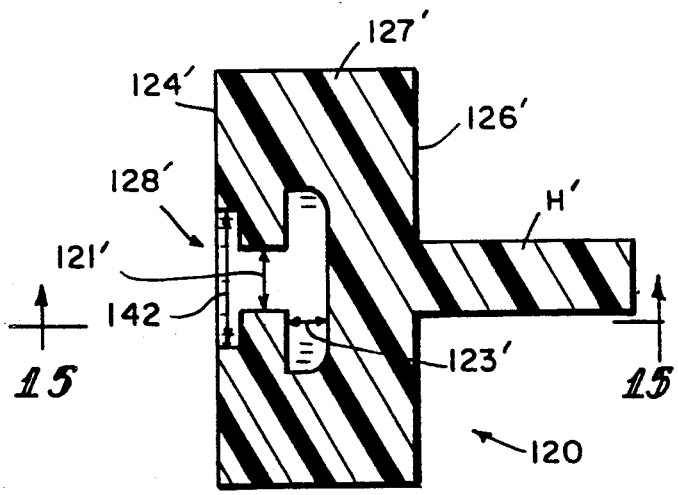
FIG. 17 shows a cross-sectional view of the alternative embodiment of the article retaining element of FIG. 15 as taken along lines 17—17 of FIG. 15.

FIGS. 15–17 show an alternative preferred embodiment of an article retaining element. To facilitate comparison with element 120, similar reference numbers are use to denote similar features. Principle distinctions include additional slot 140 having width 142 to receive shoulder 86 when element 60 or device 110 is used and shoulder 86 protrudes above the front surface of the wall in a manner which otherwise would preclude flush mounting of element 120' to the front surface of the wall. Also, entrance 128' for head 88 is through bottom 127' of element 120. Further, hook H is mounted closer to bottom 127'. In either element 120 or element 120', the inclination of the slot receiving head 88 is preferably between 1° and 5° off vertical. Element 120 is also especially suited to be utilized with a conventional threaded screw or nail where the head of screw or nail is not abutting with the wall and fits within slot 122. Element 120' is also especially suited to be similarly used with a conventional double headed or shouldered nail.

Figure 12:
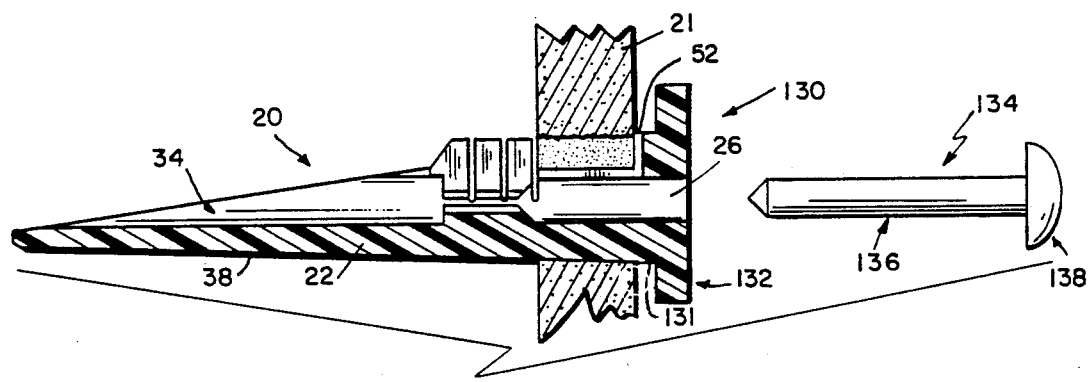
FIG. 12 show a cross-sectional view of an alternative embodiment of the expansion fastener of the present invention after initial wall penetration and prior to fastener expansion.

FIG. 12 shows another preferred embodiment of expansion fastener 20, this having a modified article retention structure 130. A second radially extending shoulder or flange 132 is attached to or integrally formed with expansion fastener 20 and is spaced apart from the structural surface or wall 21 by the thickness of flange 52 and spacer portion 131. In this embodiment, second radially extending shoulder 132 may directly retain articles supported on spacer portion 131, or may be slidably received into slot 122 in article engaging element 120. Since the expansion faster 20 supports the weight of the article, a simplified insertion element 134 may be utilized in this embodiment. Shaft 136 of element 134 engages the expansion flanges 70 in the fastener, while the shape of head portion 138 can be varied, since its principal purposes are to limit the extent of insertion to a predetermined distance, transfer insertion forces, and provide a gripable area for retraction of element 134.

Figure 13:
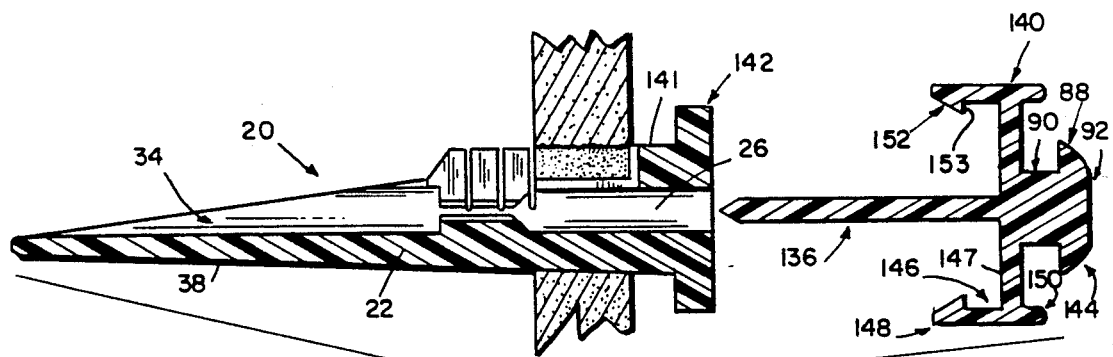
FIG. 13 shows a cross-sectional view of another alternative embodiment of the expansion fastener of the present invention with a locking insertion element after initial wall penetration and prior to fastener expansion.
Figure 14:
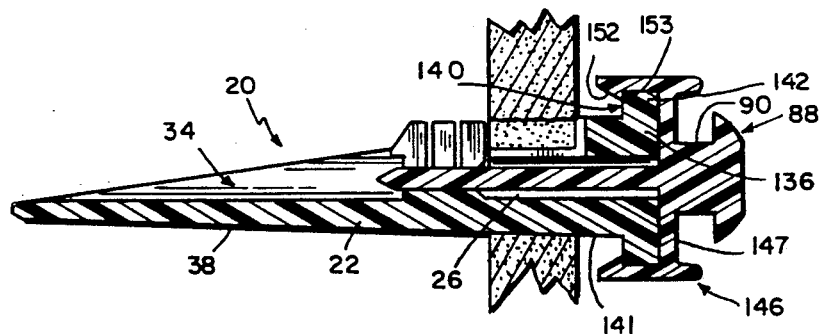
FIG. 14 shows a cross-sectional view of the alternate embodiment of an expansion fastener shown in FIG. 13 after initial wall penetration and engagement of the locking insertion element.

FIGS. 13 and 14 show yet another preferred embodiment of an expansion fastener 20, this utilizing a self-locking insertion element 140. A radially extending shoulder 142 or flange is integrally formed with or attached to the expandable fastener 20 and spaced apart from the structural surface or wall 21 by the thickness of spacer portion 141. In this embodiment of the present invention insertion element 140 includes shaft 136 and head portion 144 having features previously described with respect to other embodiments. Element 140 further includes section 146 having radial shoulder 147 with a locking element 148 and release member 150 flexibly mounted thereto.

During installation, angular tapered portion 152 of locking element 148 initially aligns and rides on shoulder 142. Once inserted past shoulder 142, the locking element 148 moves radially inward toward spacer portion 141 trapping shoulder 142 between wall 153 of portion 152 and shoulder 147 to lock the insertion element 140 in place. Shaft 136 engages expansion flanges 70 to cause retention of fastener 20 within the wall. To remove locking insertion element 148, release member 150 is squeezed radially inwardly, allowing portion 152 to clear shoulder 142 allowing insertion element 140 to be pulled from expandable fastener 20. Spacer portion 141 also is preferably thicker than spacer portion 131 to allow usage of element 120 with clearance past portion 152.

Although the present invention has been described above in detail, the same is by way of illustration and example only and is not to be taken as a limitation on the present invention. The scope and content of the present invention are defined only by the terms of the claims appended hereto.

What is claimed is:

1. An arrangement for securing an expandable fastener to a structural feature, comprising:
    an insertion element including a first and a second portion;
    said first portion including a series of truncated conical sections;
    said second portion being formed to protrude from said expandable fastener once said first portion is fully inserted within said expandable fastener;
    said expandable fastener including an internal passageway to receive said first portion;
    said internal passageway including an expandable portion for enlarging the effective dimensions of said expandable fastener in response to the insertion of said insertion element to secure said expandable fastener to said structural feature;
    said series of truncated conical sections being formed to cause elastic deformation of at least a portion of said internal passageway to restrict removal of said first portion once said first portion is fully inserted within said expandable fastener;
    said first portion includes a first cylindrical section having said truncated conical sections formed thereon;
    said first portion includes a second cylindrical section having said truncated conical sections formed thereon;
    wherein said second cylindrical section has a cross-sectional diameter greater than the cross-sectional diameter of said first cylindrical section;
    wherein said second section is located intermediate said dimensionally enlarged head and said first cylindrical section;
    said first portion includes a third cylindrical section having a cross-sectional diameter greater than the cross-sectional diameter of said second cylindrical section;
    said third cylindrical section has a cross-sectional diameter at least as great as the cross-sectional diameter of said internal passageway; and
    wherein said third cylindrical section is located intermediate said dimensionally enlarged head and said second cylindrical section.

2. A nail for insertion into a retaining structure comprising:
    a body with a first and second portion;
    said first portion including a series of truncated conical sections;
    said second portion including a dimensionally enlarged head;
    said first portion including a first group of truncated conical sections having a substantially uniform cross-sectional diameter;
    said first portion also including a second group of truncated conical sections having a substantially uniform cross-sectional diameter larger than the cross-sectional diameter of conical sections of said first group;
    said second group being located intermediate said dimensionally enlarged head and said first group;
    said first portion including a cylindrical section having a cross-sectional diameter greater than the cross-sectional diameter of said second group; and
    said cylindrical section being located intermediate to said dimensionally enlarged head and said second group.

3. A nail for insertion into a fastener element to secure that element to a structural feature, comprising:
    a body portion including a first and a second section;
    said first section being formed to be insertable with uni-directional motion into a fastener;
    said first section including a series of truncated conical sections;
    said second section formed with an enlarged head spaced apart from said series of truncated conical sections so as to extend outwardly from said fastener when said first section is fully inserted therein;
    said series of truncated conical sections are located on a first and second cylindrical section;
    the cross-sectional diameter of said second cylindrical section is greater than the cross-sectional diameter of said first cylindrical section;
    said second cylindrical section is positioned between said enlarged head and said first cylindrical section;
    said first section includes an initial tapered point and said first cylindrical section is located intermediate said enlarged head and said tapered point;
    said first section includes a third cylindrical section located between said enlarged head and said second cylindrical section; and
    the cross-sectional diameter of said third cylindrical section is greater than the cross-sectional diameter of said second cylindrical section.

* * * * *

UNITED STATES PATENT AND TRADEMARK OFFICE
CERTIFICATE OF CORRECTION

PATENT NO. : 5,098,237
DATED : March 24, 1992
INVENTOR(S) : Brian G. Harker

It is certified that error appears in the above-indentified patent and that said Letters Patent is hereby corrected as shown below:

Column 2, line 23, delete "wtih" and insert -- with -- therefor.

Column 2, line 40, delete "form" and insert -- from -- therefor.

Column 5, line 29, delete "29" and insert -- 28 -- therefor.

Column 6, line 35, delete "provide" and insert -- Provided -- therefor.

Column 9, line 36, delete "of" and insert --or -- therefor. (2nd occurrence)
Column 10, line 45, delete "use" and insert -- used -- therefor.
Column 12, line 54, insert -- a -- after "and".

Column 9, line 36, delete "elements" and insert -- element --.

Signed and Sealed this

Sixth Day of July, 1993

Attest:

MICHAEL K. KIRK

*Attesting Officer*  *Acting Commissioner of Patents and Trademarks*